Patented Dec. 13, 1927.

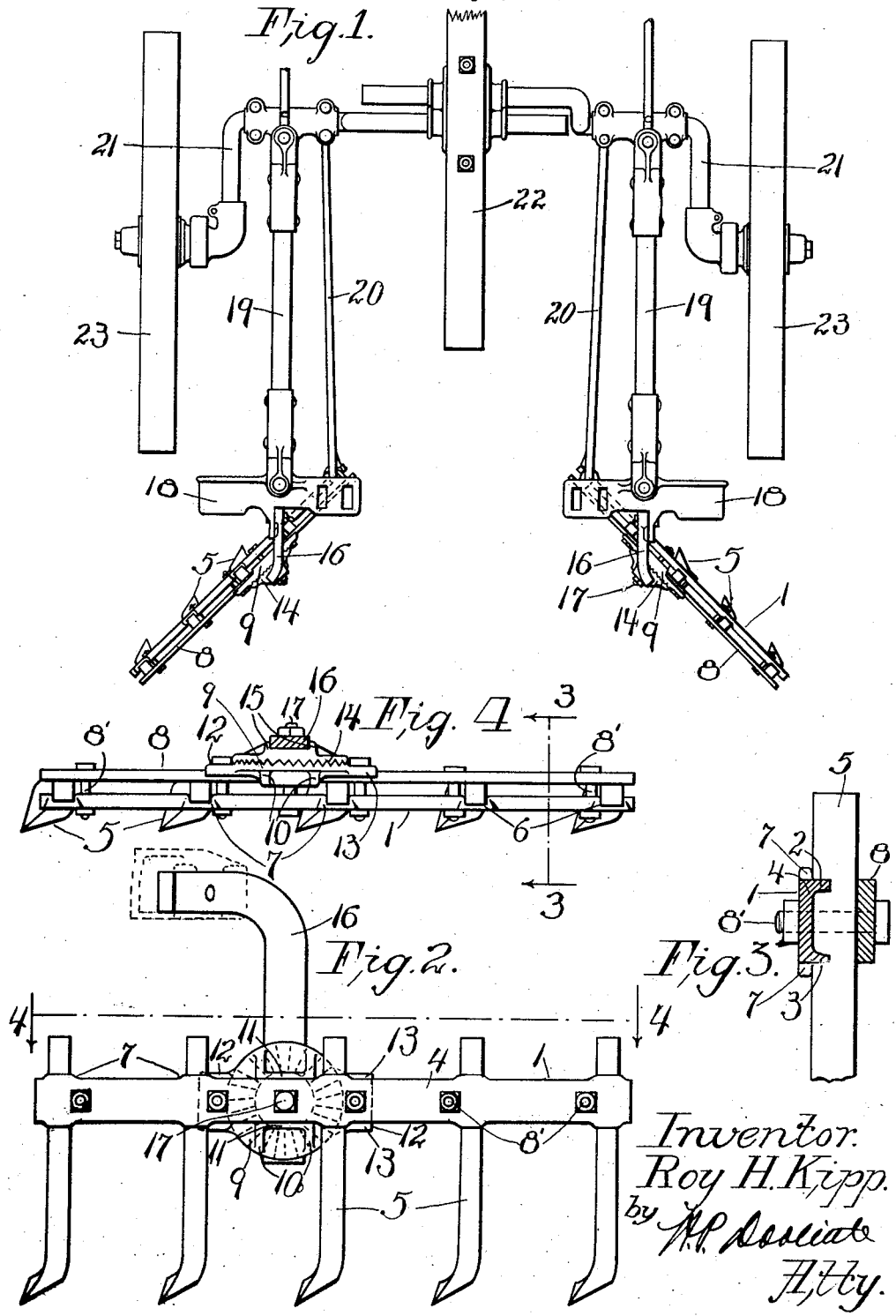

1,652,440

UNITED STATES PATENT OFFICE.

ROY H. KIPP, OF CHICAGO, ILLINOIS, ASSIGNOR TO INTERNATIONAL HARVESTER COMPANY, A CORPORATION OF NEW JERSEY.

HARROW ATTACHMENT FOR CULTIVATORS.

Application filed May 3, 1926. Serial No. 106,137.

This invention relates to cultivators and is more particularly concerned with cultivators having harrow attachments.

It is an object of the invention to provide a harrow attachment for cultivators which is advantageous in its manner of maintaining the harrow teeth in effective working position, resisting all shocks and strains which tend to displace and loosen such teeth.

It is also an object of the invention to provide a harrow attachment of novel construction for promoting economy in manufacture and savings of time and labor in the use of harrow attachments.

For accomplishing these objects and others, which will hereafter appear, the invention contemplates a structure illustrated in the accompanying drawings, in which:

Figure 1 is a plan of the illustrative cultivator having the harrow attachment applied thereto;

Figure 2 is an elevation of the harrow attachment;

Figure 3 is a detail view, partly in elevation and partly in section, taken on the line 3—3 of Figure 4, and showing the manner of clamping the harrow teeth;

Figure 4 is substantially a plan view taken on the line 4—4 of Figure 2 showing the relationships of the tooth clamping bars, the harrow teeth, the draft coupling, and adjusting device for varying the angle of cultivation.

The illustrative harrow attachment comprises the channel bar 1 having upper and lower parallel flanges 2 and 3. These flanges are connected by the tooth engaging web 4 having a width in substantial excess of the height of the flanges to afford advantageous support for the harrow teeth 5.

For insuring the desired spacing of the harrow teeth and for adequately supporting them against displacement in service, the flanges of the channel bar are formed with notches 6, which snugly receive the harrow teeth. Channel bars having relatively low flanges permit the advantageous use of a forging operation for forming the notches, portions of the flanges being upset so as to form substantial lateral extensions 7 of the web of the channel, by this operation. These extensions of the web together with the intervening portions of the web provide wide bearing surfaces in engagement with the harrow teeth for effectively bracing the latter and preventing displacement by the shocks and twisting strains to which the harrow teeth are subjected.

Twisting strains tending to displace the harrow teeth along the channel bar are resisted at comparatively widely spaced points by reason of the width of the channel bar and the consequent wide spacing of the notches.

An auxiliary clamp bar 8, parallel to the channel bar, is clamped against the opposite sides of the harrow teeth by means of tension bolts 8' passing transversely through the parallel bars.

The above described part of the illustrative structure is herein considered as a toothed unit and will be referred to as such. As this unit is intended to have its teeth penetrate the ground to a substantial extent as the cultivator traverses a field, it must bear the brunt of such severe shocks as occur when the teeth strike obstructions such as stones, roots, etc., as well as the strains of ordinary service. It is, therefore, important that the tooth unit be adequately and solidly supported with its teeth in substantially vertical positions. To this end, a substantially constructed adjusting mechanism is secured to the tooth unit. This mechanism includes a primary clamp member 9 shown bolted to the auxiliary clamp bar 8. This member has a central portion of substantially circular design and relatively large proportions so as to afford an effective bearing surface of relatively great width.

The central part of the clamp member 9 is formed on one side with upstanding strengthening ribs 10 which have parallel portions 11 forming, in effect, a groove in the clamp member for snugly receiving the auxiliary clamp bar 8. For additionally preventing relative movements between the clamp member and the bar 8 and for further strengthening the connection between them, the former has diametrically opposed extensions 12 bearing against the clamp bar. These extensions are provided with ribs 13 which form widely separated extensions of the parallel ribs 11 on the central portion of the clamp member.

The face of the clamp member 9 opposite the ribs is formed with radial corrugations for engagement with similar formations on a secondary clamp member 14 of relatively large diameter. This secondary member is formed with vertical ribs 15 for rigidifying the construction and preventing twisting of the tooth unit relative to a coupling herein shown as a twisted bar 16, having its lower end secured between the ribs 15 for supporting and bearing the entire draft of the tooth unit. A central securing bolt 17 passes through the coupling, the clamp members and the tooth clamping bars for maintaining the entire assembly in rigid condition.

The coupling 16 is formed preferably of standard flat bar stock similar in shape to that used in making cultivator standards. Intermediate its ends it is bent at right angles and twisted so that the tooth unit is presented at an effective angle to the line of draft.

The use of a single coupling for each tooth unit promotes economy of manufacture and enhances the effective operation of the harrow attachment. When the operator desires to adapt the attachment for the cultivation of ground which is thrown up or hilled about plants, he has but to make a single adjustment, loosening the bolt 17, moving the tooth unit, and then tightening the bolt. The liability of clogging of the harrow attachment by weeds is also materially reduced by the employment of a single coupling. The upper and forward end of the coupling is rigidly secured to an attachment lug extending rearwardly from a cross-head 18 attached to the rear end of a cultivator beam 19. The illustrative crosshead is pivotally attached to the beam and is held in proper transverse position by a link 20 pivoted to the cross-head and extending forwardly substantially parallel to the cultivator beam. The link and beam are pivoted at their forward ends to the frame of a cultivator comprising the cranked axles 21, connected by the tongue 22 and supported by the wheels 23.

Having described my invention, I claim:

1. In a harrow attachment for cultivators, a plurality of harrow teeth, two parallel bars having the harrow teeth clamped therebetween, and securing devices extending through said bars at intervals for pressing the bars upon the harrow teeth, one of said bars being a channel bar having its flanges upset at intervals so that the upset portions form lateral extensions in substantial alinement with the web of the channel bar leaving adjacent notches in the flanges for receiving and holding the harrow teeth.

2. A harrow attachment for cultivators comprising a series of harrow teeth, parallel clamping bars for holding said teeth therebetween in spaced parallel relationship, one of said clamping bars being constructed of channel iron formed at intervals to present widened bearing surfaces for the harrow teeth, the widened bearing surfaces comprising portions of the web of the channel bar together with extensions forged from the flanges of the channel bar, vertically alined notches formed in the flanges of the channel bar in alinement with said extensions, and a coupling bar secured to the parallel clamping bars for holding the harrow attachment in operative position upon the cultivator.

3. A cultivator comprising parallel cultivator beams, crossheads pivotally mounted on the free ends of the beams, a coupling bar centrally secured to each crosshead and extending rearwardly and downwardly therefrom, a primary clamp member secured to the lower end of the coupling bar, a secondary clamp member in contact with the primary clamp member and adjustably secured thereto, a harrow attachment secured to the secondary clamp member, said harrow attachment including a bar seated in a groove in the secondary clamp member, and a parallel channel bar between which and said first bar harrow teeth are held, said channel bar having its flanges upset at intervals to form seats for maintaining said harrow teeth securely in their operative positions.

4. A harrow attachment for cultivators comprising a channel bar, said channel bar having its flanges pressed out and upset at intervals to form together with portions of the web of the channel bar surfaces for harrow teeth, the channel bar being also provided with vertically alined notches at the positions where the flanges are upset, a complementary clamping bar parallel to the channel bar and spaced therefrom, the harrow teeth tightly fitting within said notches and bearing against extensions of the web of the channel bar formed by the upsetting of the flanges, bolts extending through the channel bar and the clamping bar for tightly pressing said bars against the harrow teeth, and a coupling bar adjustably secured to the clamping bar intermediate its ends for supporting the harrow attachment in operative position upon a cultivator.

In testimony whereof I affix my signature.

ROY H. KIPP.